(12) United States Patent
Saji et al.

(10) Patent No.: US 7,984,460 B2
(45) Date of Patent: Jul. 19, 2011

(54) DISK DEVICE WITH RING-SHAPED ELASTOMER MEMBER BETWEEN MECHANICAL CHASSIS AND WALL OF PICKUP SUPPORTING MEMBER

(75) Inventors: Yoshito Saji, Hyogo (JP); Teruyuki Takizawa, Osaka (JP); Kozo Ezawa, Osaka (JP)

(73) Assignee: Panasonic Corporation, Osaka (JP)

( * ) Notice: Subject to any disclaimer, the term of this patent is extended or adjusted under 35 U.S.C. 154(b) by 952 days.

(21) Appl. No.: 11/911,045

(22) PCT Filed: Apr. 11, 2006

(86) PCT No.: PCT/JP2006/307636
§ 371 (c)(1),
(2), (4) Date: Oct. 9, 2007

(87) PCT Pub. No.: WO2006/109796
PCT Pub. Date: Oct. 19, 2006

(65) Prior Publication Data
US 2009/0064214 A1    Mar. 5, 2009

(30) Foreign Application Priority Data

Apr. 12, 2005 (JP) ................................ 2005-114132

(51) Int. Cl.
*G11B 7/0037* (2006.01)
*G11B 33/08* (2006.01)
(52) U.S. Cl. ........................................ 720/694; 720/605
(58) Field of Classification Search .................. 720/605, 720/694, 692, 689, 658, 651, 601, 610, 600, 720/604
See application file for complete search history.

(56) References Cited

U.S. PATENT DOCUMENTS

| 4,024,580 | A | * | 5/1977 | Ban et al. | .................... | 360/96.61 |
| 4,654,840 | A | * | 3/1987 | Takahashi | ..................... | 720/605 |

(Continued)

FOREIGN PATENT DOCUMENTS

EP          0 860 832 A2       8/1998

(Continued)

OTHER PUBLICATIONS

International Search Report for corresponding Application No. PCT/JP2006/307636 dated Jul. 11, 006. PCT/ISA/237 and partial English translation.

*Primary Examiner* — Julie Anne Watko
(74) *Attorney, Agent, or Firm* — Renner, Otto, Boisselle & Sklar, LLP

(57) ABSTRACT

A disk drive according to the present invention includes: a mechanical chassis; a pickup for reading and/or writing information from/on a disk storage medium; a rotation drive section with a turntable to mount and rotate the storage medium thereon; a pickup supporting member having a bottom portion for supporting the pickup and the rotation drive section and a standup wall that stands upright from the bottom portion toward the turntable, the pickup supporting member being supported on the mechanical chassis so as to turn around an axis of rotation that is defined through the standup wall; and a pickup raising/lowering portion, which is provided for the mechanical chassis in order to drive the pickup supporting member to either a first position in which the pickup is ready to perform a read or write operation on the storage medium that is mounted on the turntable or a second position in which the turntable has been retracted so as to avoid contact with the storage medium being inserted or ejected.

5 Claims, 6 Drawing Sheets

U.S. PATENT DOCUMENTS

| | | | |
|---|---|---|---|
| 4,680,748 A * | 7/1987 | Kobayashi | 720/610 |
| 5,493,551 A * | 2/1996 | Kido | 720/620 |
| 6,045,113 A * | 4/2000 | Itakura | 248/635 |
| 6,381,091 B1 | 4/2002 | Takizawa et al. | 360/97.01 |
| 6,944,872 B2 * | 9/2005 | Moriyama et al. | 720/690 |
| 7,444,653 B2 * | 10/2008 | Makino | 720/692 |
| 7,496,940 B2 * | 2/2009 | Wang | 720/697 |
| 2003/0016593 A1 * | 1/2003 | Nagasaka et al. | 369/30.85 |
| 2005/0044558 A1 | 2/2005 | Santo et al. | 720/616 |
| 2005/0204373 A1 | 9/2005 | Ueno et al. | 720/616 |

FOREIGN PATENT DOCUMENTS

| | | |
|---|---|---|
| JP | 61-98292 | 6/1989 |
| JP | 04-098646 | 3/1992 |
| JP | 10-011949 | 1/1998 |
| JP | 10-011949 A * | 1/1998 |
| JP | 10-112104 | 4/1998 |
| JP | 10-233087 | 9/1998 |
| JP | 2000-268555 | 9/2000 |
| JP | 2003-208748 | 7/2003 |

* cited by examiner

DISK DEVICE WITH RING-SHAPED ELASTOMER MEMBER BETWEEN MECHANICAL CHASSIS AND WALL OF PICKUP SUPPORTING MEMBER

TECHNICAL FIELD

The present invention relates to a disk drive for reading and writing information from/on a disk storage medium such as an optical disk or a magneto-optical disk.

BACKGROUND ART

Some of disk drives for reading and writing information from/on a disk storage medium such as an optical disk or a magneto-optical disk adopt a mechanism for loading and unloading the given storage medium into/from the drive using a tray. Another type of disk drives, having a so-called "slot-in" mechanism for automatically loading the given storage medium that has been partially inserted into an inserting slot, are also known.

Each of these disk drives has a structure for raising and lowering a read/write pickup or a turntable that rotates and drives the given disk such that neither the pickup nor the turntable contacts with the tray or the disk being inserted into, or ejected from, the drive.

For example, Patent Document No. 1 discloses a structure for raising and lowering the pickup by defining an axis of rotation for a pickup supporting member (traverse holder) that supports the pickup and swinging the traverse holder around the axis of rotation.

On the other hand, Patent Document No. 2 discloses a structure for raising and lowering the pickup by supporting the pickup supporting member with a leaf spring in the drive and utilizing the elastic deformation of the leaf spring.

Furthermore, Patent Document No. 3 adopts a structure in which a base supports the pickup supporting member (disk player portion) with four elastic portions, thereby reducing the transmission of vibrations to the pickup supporting member. Patent Document No. 3 also proposes that the pickup supporting member be raised and lowered using two out of the four elastic portions as the fulcrums of rotation.

Patent Document No. 1: Japanese Patent Application Laid-Open Publication No. 2003-208748
Patent Document No. 2: Japanese Patent Application Laid-Open Publication No. 10-112104
Patent Document No. 3: Japanese Patent Application Laid-Open Publication No. 4-98646

DISCLOSURE OF INVENTION

Problems to be Solved by the Invention

In these conventional disk drives, however, the pickup supporting member is raised or lowered while swinging around either the axis of rotation or the fulcrums of rotation, and therefore, the turntable on the move will leave an arc trace. As a result, when the disk is mounted on the turntable, the positioning accuracy will decrease so much as to cause some errors. Also, to get the storage medium mounted on the turntable just as intended by raising the pickup supporting member, the center boss of the turntable needs to have an increased taper or a sufficient clearance needs to be allowed between the center boss and the center hole of the disk. In that case, however, the disk mounted on the turntable could move inconstantly or could be positioned with decreased accuracy, which is a problem.

In order to overcome the problems described above, the present invention has an object of providing a disk drive that has a simple structure and that includes a pickup supporting member that can mount the given storage medium on the turntable highly accurately.

Means for Solving the Problems

A disk drive according to the present invention includes: a mechanical chassis; a pickup for reading and/or writing information from/on a disk storage medium; a rotation drive section with a turntable to mount and rotate the storage medium thereon; a pickup supporting member having a bottom portion for supporting the pickup and the rotation drive section and a standup wall that stands upright from the bottom portion toward the turntable, the pickup supporting member being supported on the mechanical chassis so as to turn around an axis of rotation that is defined through the standup wall; and a pickup raising/lowering portion, which is provided for the mechanical chassis in order to drive the pickup supporting member to either a first position in which the pickup is ready to perform a read or write operation on the storage medium that is mounted on the turntable or a second position in which the turntable has been retracted so as to avoid contact with the storage medium being inserted or ejected.

In one preferred embodiment, the disk drive further includes an elastomer member between the standup wall of the pickup supporting member and the mechanical chassis.

In another preferred embodiment, the elastomer member has the shape of a ring, the center axis of the hole of which is parallel to the storage medium that is mounted on the turntable.

In another preferred embodiment, the center axis of the ring of the elastomer member crosses the axis of rotation of the pickup supporting member at right angles.

In another preferred embodiment, the center axis of the ring of the elastomer member is parallel to the axis of rotation of the pickup supporting member.

In another preferred embodiment, the standup wall of the pickup supporting member has a hole, the elastomer member is secured to the standup wall so as to have its outer periphery fitted into the hole of the standup wall, and the mechanical chassis has a supporting rod to be inserted into the hole of the ring of the elastomer member.

In another preferred embodiment, the pickup supporting member has support pins and the pickup raising/lowering portion has a cam shape to guide the support pins.

In another preferred embodiment, the support pins are arranged on one side of the bottom portion so as to face the standup wall.

In another preferred embodiment, the pickup is supported on the bottom portion so as to be movable back and forth between the supporting pins and the standup wall and the pickup is able to contact with the elastomer member.

In another preferred embodiment, the standup wall of the pickup supporting member has a hole, the elastomer member is secured to the standup wall so as to have its outer periphery fitted into the hole of the standup wall, and the mechanical chassis has a supporting rod to be inserted into the hole of the ring of the elastomer member.

In another preferred embodiment, the pickup supporting member has support pins and the pickup raising/lowering portion has a cam shape to guide the support pins.

In another preferred embodiment, the disk drive further includes an outer housing to store the mechanical chassis, and a second elastomer member, which is arranged between the mechanical chassis and the outer housing. The natural frequency of the elastomer member is different from that of the second elastomer member.

In another preferred embodiment, when the pickup supporting member is in the first position, the distance from a plane of the turntable on which the storage medium is supported to the axis of rotation is 3 mm or less as measured perpendicularly to the storage medium.

Effects of the Invention

In the disk drive of the present invention, the pickup supporting member includes a standup wall that rises toward the turntable and the axis of rotation of the pickup supporting member is defined through the standup wall. As a result, the clearance to be allowed between the center boss and the center hole of the storage medium can be reduced, and the storage medium can be mounted on the turntable with less inconstant movement permitted and with higher positioning accuracy achieved.

Figure 1:
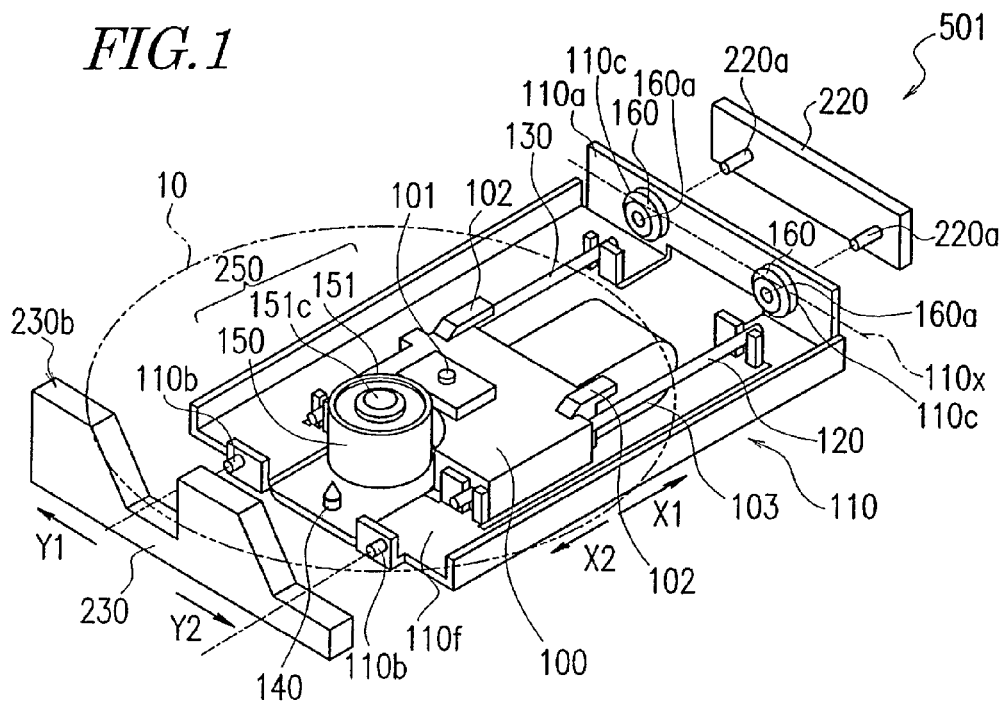
FIG. 1 is a perspective view illustrating the main portion of a first preferred embodiment of a disk drive according to of the present invention.

DESCRIPTION OF REFERENCE NUMERALS 10 storage medium
100 pickup
102 stopper
110, 210 pickup supporting member
110x, 210x rotation axis
110a, 210b standup wall
140 positioning pin
151 turntable
160, 260 elastomer elastic body
220 mechanical chassis
230 pickup raising/lowering portion

BEST MODE FOR CARRYING OUT THE INVENTION

Embodiment 1

Hereinafter, a first preferred embodiment of a disk drive according to the present invention will be described with reference to FIGS. 1 through 9.

FIG. 1 is an exploded perspective view illustrating the main portion of a disk drive 501.

The disk drive 501 includes a pickup 100, a mechanical chassis 220, a rotation drive section 250, a pickup supporting member 110 and a pickup raising/lowering portion 230.

The pickup 100 reads and/or writes information from/on a disk storage medium 10. Information may be read or written either optically or magneto-optically. The storage medium 10 may be a CD, a DVD or a BD, for example. In this case, the pickup 100 includes an objective lens 101 and emits a light beam, having a wavelength associated with the type of the storage medium 10, through the objective lens 101. Also, the pickup 100 receives the light that has been reflected from the storage medium 10 through the objective lens 101. The pickup 100 has only to perform at least one of read and write operations.

As will be described later, the pickup 100 has a stopper 102. Also, the pickup 100 is connected to a flexible printed circuit board (FPC) so as to exchange information with a signal processing section (not shown) and a drive section that controls the position of the pickup.

The rotation drive section 250 includes a spindle motor 150 and a turntable 151. The turntable 151 mounts the storage medium 10 and the spindle motor 150 turns the turntable 151, thereby rotating and driving the storage medium 10. The turntable 151 has a center boss 151c to which the center hole of the storage medium 10 is inserted.

The pickup supporting member 110 includes a bottom portion 110f to support the pickup 100 and the rotation drive section 250 thereon and a standup wall 110a that stands upright from the bottom portion 110f toward the turntable 151.

On the bottom portion 110f, arranged are a main shaft 130 and an auxiliary shaft 120 for guiding the pickup 100 between the inner and outer edges of the storage medium 10 in the direction pointed by the arrow X1 or X2. That is to say, the pickup 100 is supported on the pickup supporting member 110 so as to be movable on either the main shaft 130 or the auxiliary shaft 120 in the direction pointed by the arrow X1 or X2. The drive section 250 is also supported on the bottom portion 110f.

The standup wall 110a is arranged so as to stand up from the bottom portion 110f toward the turntable 151. The angle formed between the bottom portion 110f and the standup wall 110a is preferably approximately 90 degrees, and more specifically falls within the range of 80 degrees to 100 degrees. The standup wall 110a may form an integral part of the bottom portion 110f. Alternatively, the standup wall 110a may be formed separately from the bottom portion 110f and secured to the bottom portion 110f so as to stand up from the bottom portion 110f toward the turntable 151.

Further arranged on the bottom portion 110f are raising/lowering support pins 110b that face the standup wall 110a in the direction X1 or X2 in which the pickup 100 moves. In other words, a pair of lines that connects the support pins 110b to the standup wall 110a is approximately parallel to the direction in which the pickup 100 moves. A positioning pin 140 is also provided on the bottom portion 110f of the pickup supporting member 110. The positioning pin 140 is arranged in the vicinity of the turntable 151 of the rotation drive section and positioned highly accurately with respect to the turntable 151.

The pickup supporting member 110 is supported on the mechanical chassis 220 so as to rotate on an axis of rotation 110x that is provided for the standup wall 110a. The pickup supporting member 110 is driven around the axis of rotation 110x by the pickup raising/lowering portion 230. More specifically, the pickup raising/lowering portion 230 drives the pickup supporting member 110 to either a first position in which the storage medium 10 is mounted on the turntable 151 such that the pickup 100 can perform a read or write operation thereon or a second position in which the turntable 151 has been retracted so as to avoid contact with the storage medium 10 being inserted or ejected.

In this preferred embodiment, the pickup raising/lowering portion 230 is provided for the mechanical chassis 220 and includes a cam 230b, which is in contact with the raising/lowering support pins 110b. As shown in FIG. 1, as the pickup raising/lowering portion 230 travels in the direction Y1 or Y2, the raising/lowering support pins 110b go up or down along the cam 230b perpendicularly to the storage medium 10. As a result, the pickup supporting member 110 is drive to either the first position or the second position. Alternatively, the pickup raising/lowering portion 230 may drive the pickup supporting member 110 using a rack pinion gear mechanism or any other suitable mechanism.

The disk drive 501 preferably further includes elastomer members 160 between the standup wall 110a of the pickup supporting member 110 and the mechanical chassis 220. The elastomer members 160 are made of rubber or any other material with high elasticity, and preferably have a ring shape. As shown in FIG. 1, the standup wall 110a of the pickup supporting member 110 has a pair of holes 110c, of which the centers are located on an axis of rotation 110x and the elastomer members 160 are secured with their outer periphery fitted into the holes 110c. In this preferred embodiment, the ringlike holes 160a of the elastomer members 160 cross the axis of rotation 110x at right angles. A pair of supporting rods 220a provided for the mechanical chassis 220 is fitted into their associated holes 160a of the elastomer members 160.

Figure 2:
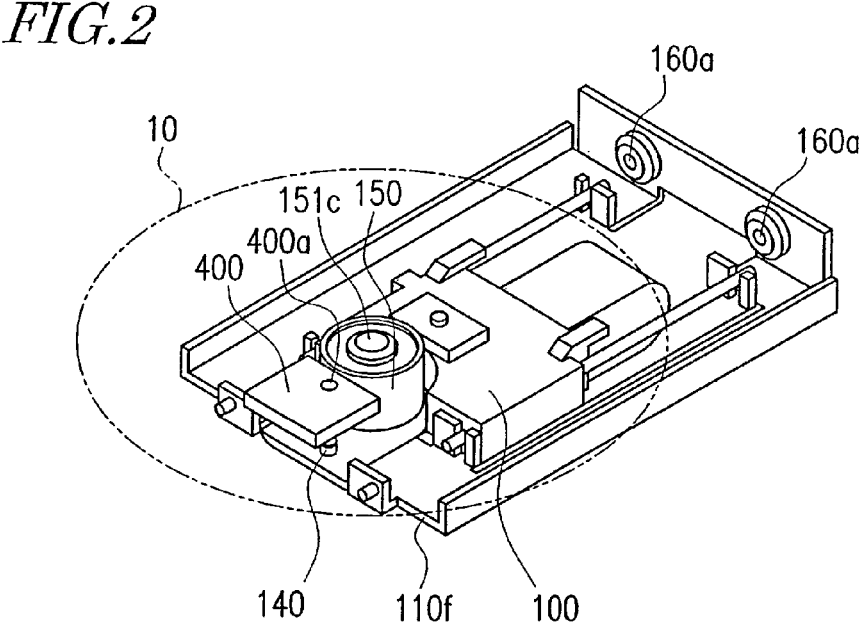
FIG. 2 is a perspective view illustrating how the pickup supporting member and the tray shown in FIG. 1 are positioned with respect to each other.

FIG. 2 illustrates a state where the pickup supporting member 110 has been raised and now located in the first position in which the storage medium 10 is mounted on the turntable 151 and the pickup is ready to perform a read or write operation thereon. While the pickup supporting member 110 is located in the first position, the positioning pin 140 arranged on the bottom portion 110f fits into the positioning hole 400a of a tray 400 to be described later.

Hereinafter, it will be described with reference to FIGS. 3 and 4 how the disk drive 501 operates.

Figure 3:
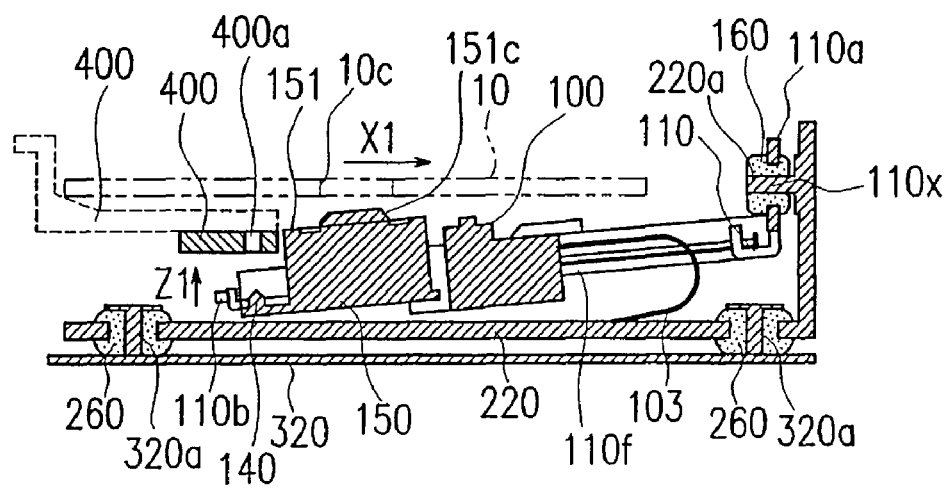
FIG. 3 is a cross-sectional view illustrating how the disk drive shown in FIG. 1 looks when the pickup supporting member is retracted.
Figure 4:
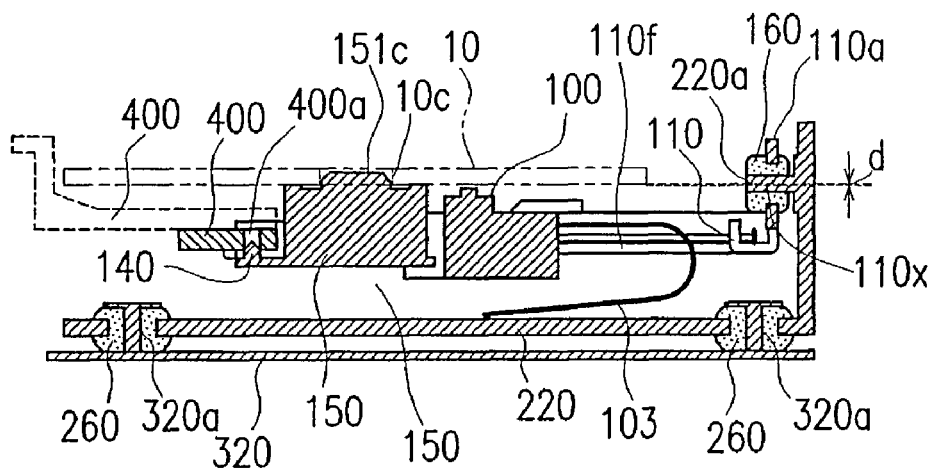
FIG. 4 is a cross-sectional view illustrating how the disk drive shown in FIG. 1 looks when the pickup supporting member is raised.

FIGS. 3 and 4 are cross-sectional views of the disk drive 501 as viewed on a plane that passes the respective centers of the spindle motor 150 and the objective lens 101. Specifically, FIG. 3 illustrates a state where the pickup supporting member 110 has been retracted to the second position, while FIG. 4 illustrates a state where the pickup supporting member 110 is ready to perform a read or write operation in the first position. As shown in FIGS. 3 and 4, the disk drive 501 preferably further includes an outer housing 320 and the mechanical chassis 220 is secured to supporting rods 320a of the outer housing 320 with elastomer members 260.

The natural frequency of the elastomer members 260 is preferably different from that of the elastomer members 160. Then it is possible to prevent external vibrations from being transmitted to the rotating storage medium 10 during a read or write operation. Or vibrations caused by the rotating storage medium 10 will not be transmitted to an external device, either.

As shown in FIG. 3, while the pickup supporting member 110 is retracted to the second position, the storage medium 10 is loaded. Specifically, when the user presses a play button or a storage medium insert button after having put the storage medium 10 on a tray 400 that has been ejected outside of the disk drive 501, the tray 400 that mounts the storage medium 10 thereon is inserted into the disk drive 501 as pointed by the arrow X1.

In the meantime, the pickup supporting member 110 is located at the second position in which the turntable 151 is retracted so as not to interfere with the tray 40 or the storage medium 10. In this state, the elastomer members 160 supports the pickup supporting member 110 in a tilted position while being elastically deformed between the standup wall 110a of the pickup supporting member 110 and the supporting rods 220a of the mechanical chassis 220.

As the tray 400 goes deeper, the center hole 10c of the storage medium 10 on the tray 400 will soon be located right over the center boss 151c of the turntable 151, when the insertion of the tray 400 will be completed.

Next, the pickup raising/lowering portion 230 (see FIG. 1) lifts the raising/lowering pins 110b in the direction pointed by the arrow Z1. As a result, the pickup supporting member 110 turns on the axis of rotation 110x so as to go upward and soon gets settled in the horizontal position as shown in FIG. 4. At this point in time, the positioning pin 140 of the pickup supporting member 110 is fitted into the positioning hole 400a of the tray 400 while being guided by the tapered portion of the positioning pin 140 itself. In this manner, the pickup supporting member 110 is positioned with respect to the tray 400.

The positioning pin 140 is arranged with respect to the turntable 151 of the rotation drive section with high positioning accuracy. That is why the turntable 151 on the pickup supporting member 110 is now accurately positioned with respect to the storage medium 10 on the tray 400, and therefore, the disk 10 on the tray 400 can be mounted on the turntable 151 just as intended by inserting the center boss 151c of the turntable 151 into the center hole 10c of the storage medium 10. That is to say, errors are much less likely to occur when the storage medium 10 should get chucked.

When the storage medium 10 is put in place on the turntable 151, the pickup 100 starts to perform a read or write operation.

On the other hand, to unload the storage medium 10 from the disk drive 501, the user may press an eject button, for example. In accordance with this instruction, the pickup raising/lowering portion drives the pickup supporting member 110 to the second position. While the pickup supporting member 110 is going down, the storage medium 10 disengages itself from the turntable 151. And when the pickup supporting member 110 reaches the second position, the tray 400 with the storage medium 10 is ejected.

During these operations, when the pickup supporting member is located in the first position with the storage medium 10 mounted on the turntable 151, the pickup supporting member 110 is positioned with respect to the mechanical chassis 220 by inserting the positioning pin 140 into the positioning hole 400a of the tray. At this point in time, however, the pickup supporting member 110 may be misaligned with the mechanical chassis 220 either in the direction pointed by the arrow X1 (or X2) or in the direction pointed by the arrow Y1 (or Y2).

Figure 5:
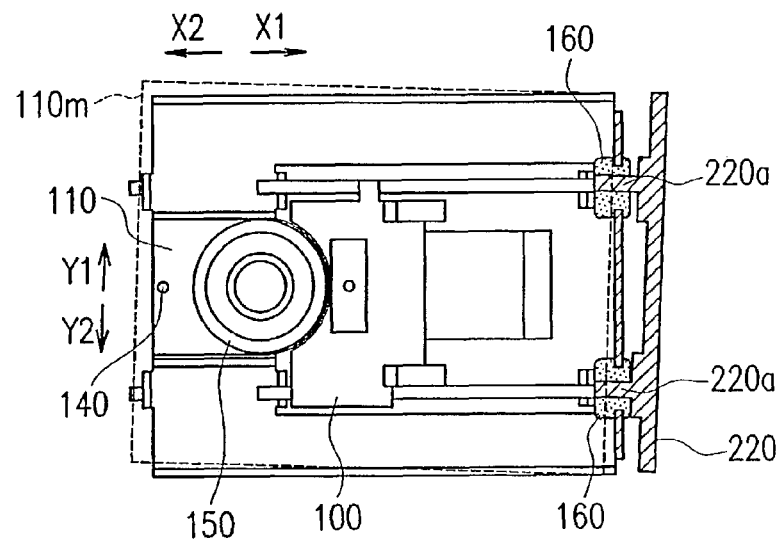
FIG. 5 is a top view of the disk drive in the state shown in FIG. 4.

FIG. 5 is a top view illustrating the pickup supporting member 110 and the mechanical chassis 220 when the pickup supporting member 110 is located in the first position. The positioning pin 140 is fitted into the positioning hole 400a of the tray 400 in a situation where the pickup supporting member 110 has shifted from its regular position, as indicated by the dashed line 100m, with respect to the mechanical chassis 220; Even so, the positional shift in the direction pointed by the arrow Y1 can be offset by the elastic deformation of the elastomer members 160 that now hold the pickup supporting member 110 obliquely with respect to the mechanical chassis 220. Likewise, the positional shift in the direction pointed by the arrow X2 can also be offset without subjecting the pickup supporting member 110 to excessive force if the elastomer members 160 move along the supporting rods 220a of the mechanical chassis 220 (i.e., in the direction pointed by the arrow X2). The same effects can also be achieved by the elastic deformation of the elastomer members 160 even if the shift has occurred in any of the opposite directions (i.e., in the direction pointed by the arrow Y2 or X1).

As described above, according to this preferred embodiment, the axis of rotation of the pickup supporting member 110 is defined through the standup wall 110a. That is why the storage medium 10 can be mounted on the turntable 11 particularly accurately. Hereinafter, this point will be described with reference to FIGS. 6A and 6B.

Figure 6A:
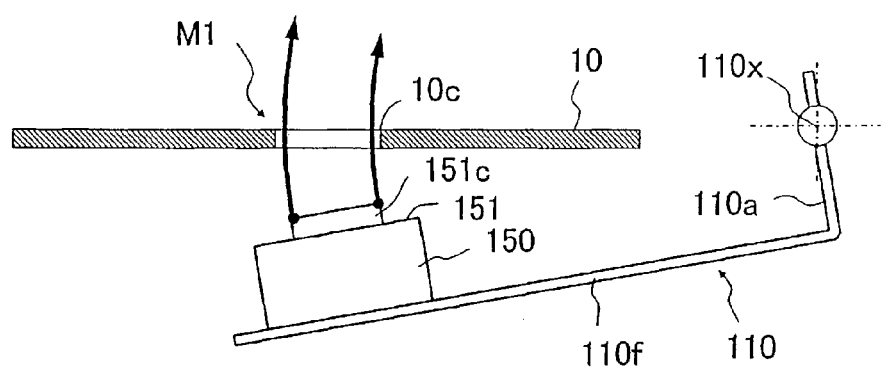
FIG. 6A schematically shows what trace the center boss of the turntable will leave as the pickup supporting member turns in the disk drive shown in FIG. 1, and FIG. 6B schematically shows what trace the center boss of a turntable will leave as the pickup supporting member turns in a conventional disk drive.
Figure 6B:
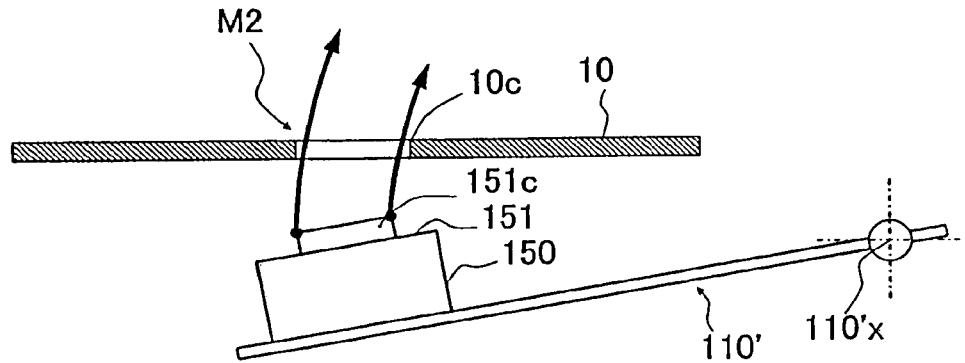
Figure 7:
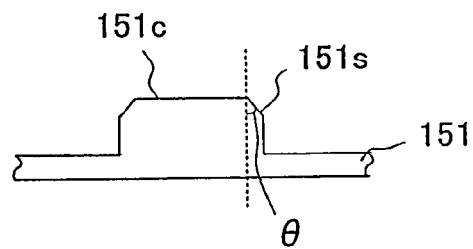
FIG. 7 is a cross-sectional view of the turntable.

FIG. 6A schematically shows what trace the center boss 151c of the turntable 151 will leave as the pickup supporting member 110 turns around the axis of rotation 110x. On the other hand, FIG. 6B schematically shows what trace the center boss of a turntable will leave as the pickup supporting member turns in a conventional disk drive.

As shown in FIG. 6A, according to this preferred embodiment, the axis of rotation 110x of the pickup supporting member 110 is defined through the standup wall 110a. Since the standup wall 110a stands upright toward the turntable 151, the center boss 151c of the turntable 151, which is rising toward the storage medium 10 on the tray 400, will leave an arc trace, of which the center is located in the vicinity of the storage medium 10, perpendicularly to the storage medium 10. That is why the trace left by the center boss 151c becomes almost perpendicular to the storage medium 10 in the vicinity of the center hole 10c of the storage medium 10.

In the conventional disk drive, on the other hand, the axis of rotation 110x' of the pickup supporting member 110' is away from the storage medium 10 on the tray 400 perpendicularly to the storage medium 10. Consequently, the trace to be left by the center boss 151c that passes through the center hole 10c of the storage medium 10 becomes tilted with respect to the storage medium 10.

This means that according to this preferred embodiment, the positioning margin M1 to be allowed between the center hole 10c and the center boss 151c rising can be smaller than the margin M2 to be left in the conventional drive. That is to say, according to this preferred embodiment, the clearance to be allowed between the center boss and the center hole of the storage medium can be reduced compared to the conventional one and the storage medium can be mounted on the turntable with less inconstant movement permitted and with higher positioning accuracy achieved.

Depending on the magnitude of this margin, error may or may not occur when the storage medium is mounted on the turntable. According to this preferred embodiment, the positioning margin M1 to be allowed between the center hole 10c and the center boss 151c may be small, and therefore, the tapered portion 151s that should be provided for the center boss 151c of the turntable 151 to guide the center hole of the storage medium 10 smoothly does not have to have a large angle θ. That is to say, since the tapered portion 151s is relatively steep, the storage medium can be guided smoothly.

Meanwhile, in the conventional disk drive, the margin M2 to be allowed is so wide that the angle θ should be large. If the angle θ is too large, however, the storage medium cannot be guided smoothly even when the inner edge of the center hole 10c of the storage medium 10 contacts with the tapered portion 151s. In a worst-case scenario, the storage medium could not be mounted on the turntable.

To achieve such an effect of this preferred embodiment, when the pickup supporting member 110 is in the first position in which the storage medium 10 is mounted on the turntable 151, the distance d between a plane of the turntable 151 on which the storage medium 10 is supported and the axis of rotation 110x of the pickup supporting member 110 as measured perpendicularly to the storage medium 10 is preferably as small as possible as shown in FIG. 4. Specifically, if the storage medium has a diameter of 12 cm, the distance d is preferably 3 mm or less. As long as the distance d falls within this range, the axis of rotation may be located either above or below that plane of the turntable.

Also, according to this preferred embodiment, the pickup supporting member 110 is made up of a bottom portion and a standup wall and the axis of rotation is defined through the standup wall 110a. Consequently, the size of the pickup supporting member can be reduced in the depth direction, in particular, and a disk drive or disk apparatus of a smaller size is realized.

On top of that, the standup wall 110a is supported by the mechanical chassis with the elastomer members 160 interposed between them and is used as the axis of rotation. In this manner, the positional shift of the pickup supporting member 110 can be offset by the elastomer members 160 and smooth operations are realized as a result.

Figure 8:
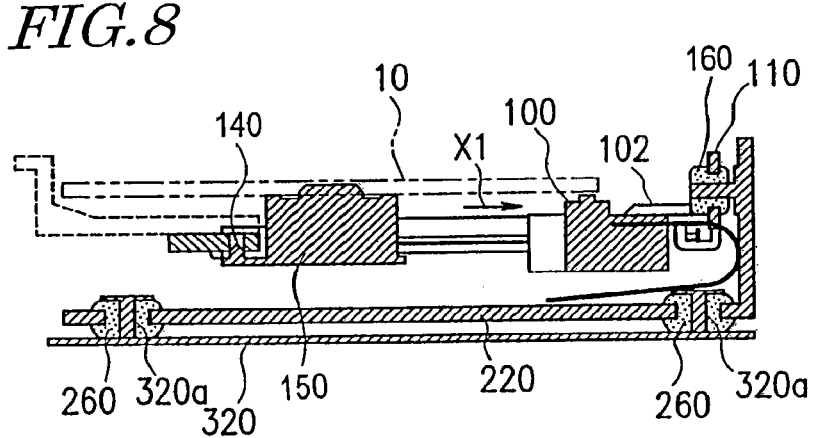
FIG. 8 is a cross-sectional view showing how the disk drive shown in FIG. 1 looks when the pickup reaches the outermost area.
Figure 9:
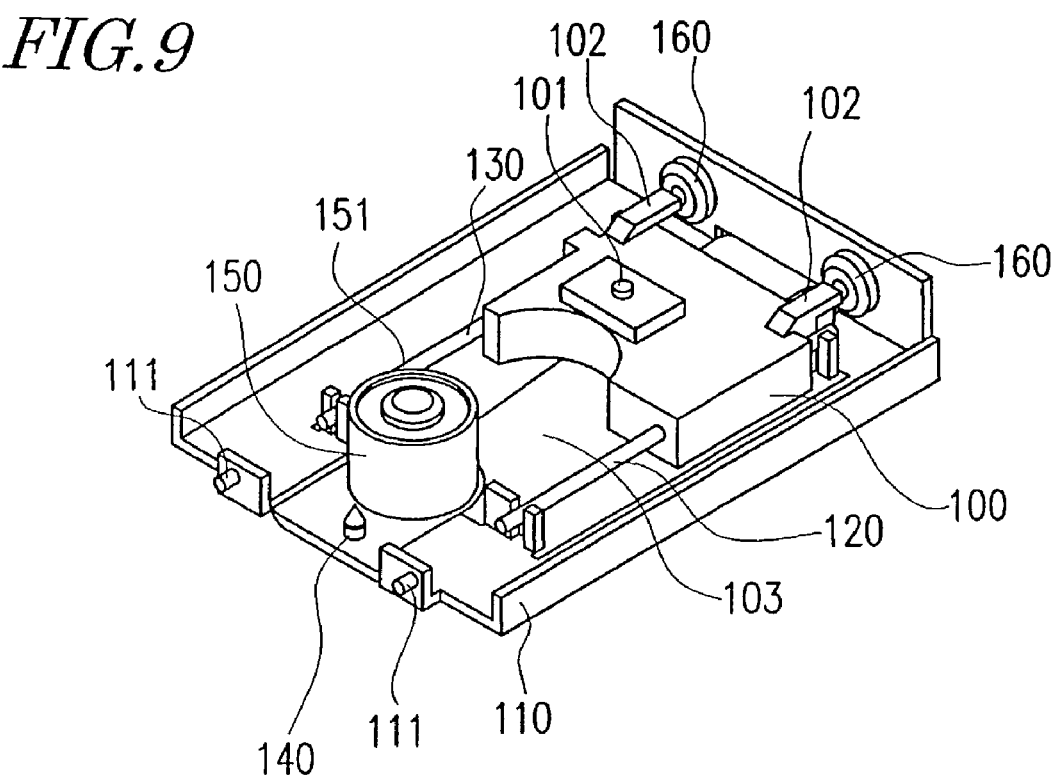
FIG. 9 is a perspective view of the disk drive in the state shown in FIG. 8.

Next, the function of the stopper 102 will be described. FIG. 8 is a cross-sectional view illustrating a situation where the pickup 100 has moved in the direction pointed by the arrow X1 to reach the outermost area of the storage medium 10 while the pickup supporting member 110 is in the first position. FIG. 9 is a perspective view illustrating the pickup supporting member 110 in the same state. As shown in FIGS. 8 and 9, the pair of stoppers 102 provided on the right- and left-hand sides of the pickup 100 is now in contact with the elastomer members 160.

In rest position (and when shipped from the factory, too), the pickup 100 is located under the inner area of the disk 10. If the disk drive in such a state were dropped in the direction pointed by the arrow X1, then the pickup 100 would move in the direction pointed by the arrow X1. And in a normal disk drive, the pickup 100 would collide against the mechanical chassis with greater acceleration than the impact acceleration of the disk drive dropping. In the disk drive of this preferred embodiment, however, the pickup 100 that has moved in the direction pointed by the arrow X1 is caught softly by the elastomer members 160. As a result, the impact acceleration of the pickup 100 dropping can be reduced significantly and the disk drive is much less likely to cause a failure even when dropped.

As described above, according to this preferred embodiment, a standup wall that stands upright toward the turntable is provided for the pickup supporting member and the axis of rotation of the pickup supporting member is defined through the standup wall. In this manner, the clearance to be allowed in positioning the center boss with respect to the center hole of the storage medium can be reduced. As a result, the storage medium can be mounted on the turntable with much less inconstant movement permitted and with higher positioning accuracy achieved.

In addition, by defining the axis of rotation of the pickup supporting member through the standup wall, the structure with the axis of rotation can be arranged above the space in which the pickup moves, and the size of the pickup supporting member can be reduced in the depth direction, in particular.

What is more, by designing the disk drive such that the pickup will collide with the ringlike elastic members when the disk drive is dropped, the impact acceleration to be caused by the drop can be reduced and the pickup can be protected from damage.

Embodiment 2

Hereinafter, a second preferred embodiment of a disk drive according to the present invention will be described with reference to FIGS. 10 and 11.

Figure 10:
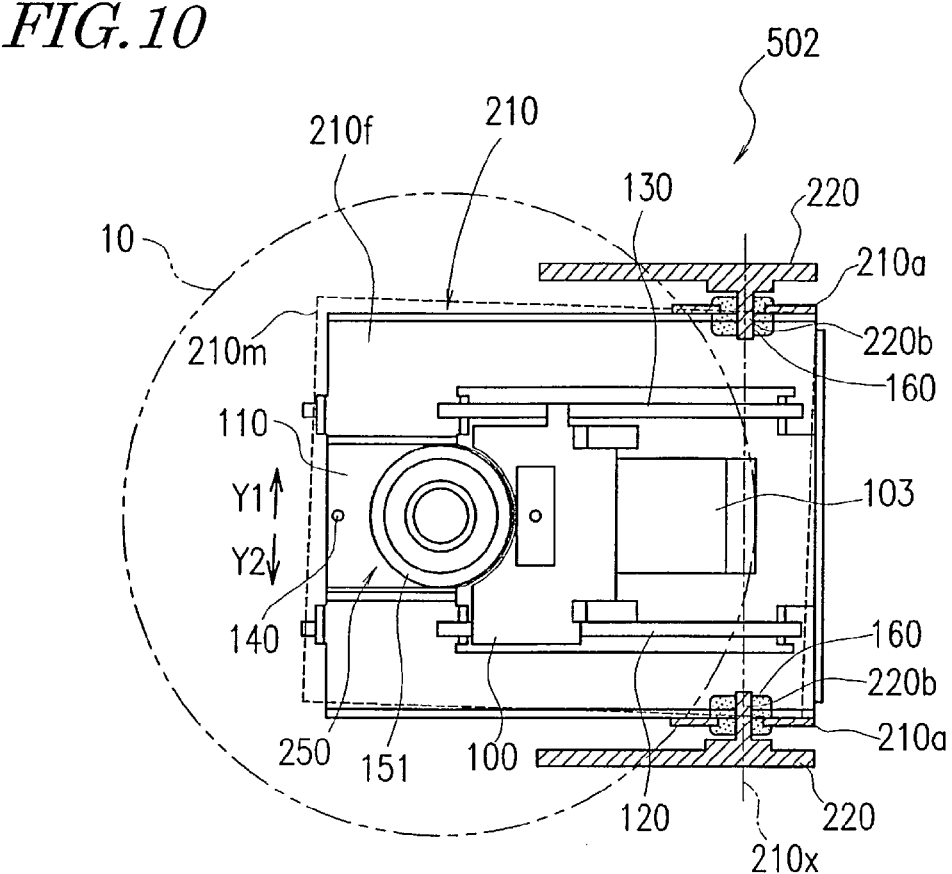
FIG. 10 is a perspective view illustrating the main portion of a second preferred embodiment of a disk drive according to of the present invention.
Figure 11:
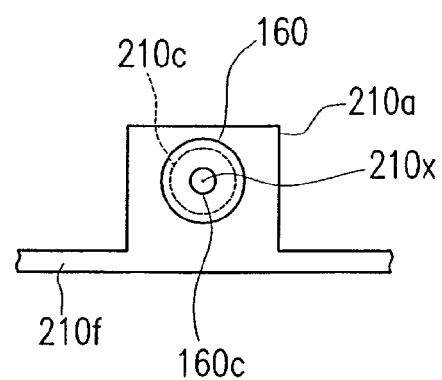
FIG. 11 is a side view illustrating the standup wall of the disk drive shown in FIG. 10.

FIG. 10 is a top view illustrating the main portion of a disk drive 502.

In FIG. 10, any component of the disc drive 502, having the same function as the counterpart of the first preferred embodiment described above, is identified by the same reference numeral. The disk drive 502 includes a rotation drive section, a pickup 100, a pickup supporting member 210 and a mechanical chassis 220. In the disk drive 502, the standup wall of the pickup supporting member 210 is located at a different position from that of the first preferred embodiment. Specifically, the pickup supporting member 210 includes a bottom portion 210*f* to support the rotation drive section and the pickup 100 and a pair of standup walls 210*a*.

The standup walls 210*a* stand upright from the bottom portion 210*f* and face each other in a direction that intersects with the traveling direction of the pickup 100. FIG. 11 is a side view of the standup wall 210*a*.

As in the first preferred embodiment described above, each of these standup walls 210*a* has a hole 210*c* and a ringlike elastomer member 160 is secured to the standup wall 210*a* so as to have its outer periphery fitted into the hole 210*c*. The center axis of the respective ringlike holes of these elastomer members 160 crosses the traveling direction of the pickup 100 at right angles. Also, the axis of rotation 210*x* of the pickup supporting member 210 is parallel to the center axis of the ringlike holes 160*c* of the elastomer members 160.

The mechanical chassis 220 has a pair of rotation supporting rods 220*b* that extend parallel to the axis of rotation 210*x* and that are fitted into, and engaged with, the holes 160*c* of the elastomer members 160.

The pickup supporting member 210 turns while sliding on the standup walls 240*b* 210*a* or the rotation supporting rods 220*b* of the mechanical chassis 220 on either the outer periphery or inner periphery of the ringlike elastomer members 160 to be lifted upward and driven to the first position as in FIG. 4.

In this case, the pickup supporting member 210 turns on the axis of rotation 240*y* 210*x*, which is approximately aligned with the center axis of the elastomer members 160. As in FIG. 4, the positioning pin 140 of the pickup supporting member 210 is also fitted into the positioning hole 400*a* of the tray 400, thereby positioning the pickup supporting member 210 with respect to the tray 400. The positioning pin 140 is also arranged on the bottom portion 210*f* of the pickup supporting member in the vicinity of the turntable 151 and positioned highly accurately with respect to the turntable 151. Consequently, the storage medium 10 on the tray 400 can be mounted on the turntable 151 highly accurately.

In this case, the pickup supporting member 210, positioned by the combination of the positioning pin 140 and the positioning hole, may have slightly shifted in the direction pointed by the arrow Y1 or Y2. Then, the pickup supporting member 210 is misaligned with respect to the mechanical chassis 220. In FIG. 10, the regular position of the pickup supporting member 210 is indicated by the dashed line 210*m*. The positional shift in the direction pointed by the arrow Y1 can be offset, without subjecting the pickup supporting member 210 to excessive force, by the elastic deformation of the elastomer members 160 that now hold the pickup supporting member 210 obliquely. The shift in the opposite direction (i.e., in the direction pointed by the arrow Y2) can also be offset in the same way.

In addition, since the axis of rotation 210*x* is defined through the standup walls 210*a*, the distance between the turntable plane and the axis of rotation 210*x* can be decreased as measured perpendicularly to the storage medium 10. Thus, the clearance to be allowed between the center hole 10*c* of the storage medium 10 and the center boss 151*c* rising can be reduced. As a result, the storage medium can be mounted on the turntable with less inconstant movement permitted and with higher positioning accuracy achieved.

As can be seen, according to this preferred embodiment, by providing standup walls that stand upright toward the turntable for the pickup supporting member and by defining the axis of rotation of the pickup supporting member through the standup walls as in the first preferred embodiment described above, the clearance to be allowed between the center boss and the center hole of the storage medium can be reduced. As a result, the storage medium can be mounted on the turntable with less inconstant movement permitted and with higher positioning accuracy achieved.

In addition, by defining the axis of rotation of the pickup supporting member through the standup walls, the structure with the axis of rotation can be arranged above the space in which the pickup moves, and the size of the pickup supporting member can be reduced in the depth direction, in particular.

In the first and second preferred embodiments described above, the storage medium is supposed to be loaded and unloaded into/from the disk drive using a tray. However, the present invention is also effectively applicable to a slot-in type disk drive that is supposed to be loaded with a storage medium directly without using a tray. In that case, the positioning hole may be provided for a loading mechanism that loads the storage medium into the disk drive or in the vicinity of a structure that defines the position of the storage medium that has been loaded by the loading mechanism.

Industrial Applicability

The present invention can be used effectively in various disk drives for reading and/or writing information from/on disk storage media such as optical disks and magneto-optical disks.

The invention claimed is:

1. A disk drive comprising:
a mechanical chassis;
a pickup for reading and/or writing information from/on a disk storage medium;
a rotation drive section with a turntable configured to mount and rotate the storage medium thereon in a plane of rotation;
a pickup supporting member having a base portion for supporting the pickup and the rotation drive section and a standup wall that extends from the base portion toward the plane of rotation, the pickup supporting member being supported on the mechanical chassis so as to turn around an axis of rotation that is defined through the wall;

a pickup raising/lowering portion, which is provided for the mechanical chassis in order to drive the pickup supporting member to either a first position in which the pickup is ready to perform a read or write operation on the storage medium that is mounted on the turntable or a second position in which the turntable has been retracted so as to avoid contact with the storage medium being inserted or ejected; and an elastomer member, which is arranged between the wall of the pickup supporting member and the mechanical chassis, wherein the elastomer member has the shape of a ring, the center axis of the hole of which is not only parallel to the storage medium that is mounted on the turntable but also crosses the axis of rotation of the pickup supporting member at right angles.

2. The disk drive of claim 1, wherein the wall of the pickup supporting member has a hole, the elastomer member is secured to the wall so as to have its outer periphery fitted into the hole of the wall, and the mechanical chassis has a supporting rod to be inserted into the hole of the ring of the elastomer member.

3. The disk drive of claim 2, wherein the pickup supporting member has support pins and the pickup raising/lowering portion has a cam shape to guide the support pins.

4. The disk drive of claim 3, wherein the support pins are arranged on one side of the base portion so as to extend parallel to a direction in which the pickup moves.

5. The disk drive of claim 4, wherein the pickup is supported on the base portion so as to be movable back and forth between the supporting pins and the wall and wherein the pickup is able to contact with the elastomer member.

* * * * *